United States Patent
Gossio

(10) Patent No.: US 10,739,222 B1
(45) Date of Patent: Aug. 11, 2020

(54) MAGNETIC PIPELINE PRESSURE SENSOR/MONITOR WITH WIRELESS TRANSCEIVER

(71) Applicant: Victor Gossio, Houston, TX (US)

(72) Inventor: Victor Gossio, Houston, TX (US)

( * ) Notice: Subject to any disclaimer, the term of this patent is extended or adjusted under 35 U.S.C. 154(b) by 32 days.

(21) Appl. No.: 15/650,950

(22) Filed: Jul. 16, 2017

Related U.S. Application Data

(60) Provisional application No. 62/363,265, filed on Jul. 16, 2016.

(51) Int. Cl.
| | |
|---|---|
| *G01M 3/28* | (2006.01) |
| *F16L 55/07* | (2006.01) |
| *H04B 1/16* | (2006.01) |
| *G01L 19/08* | (2006.01) |

(52) U.S. Cl.
CPC ............ *G01L 19/086* (2013.01); *F16L 55/07* (2013.01); *H04B 1/16* (2013.01); *G01M 3/2815* (2013.01)

(58) Field of Classification Search
CPC . F16L 55/07; H04B 1/16; G01L 19/00; G01L 19/08; G01L 19/086; G01M 3/00; G01M 3/26; G01M 3/28; G01M 3/2815
See application file for complete search history.

(56) References Cited

U.S. PATENT DOCUMENTS

| | | | |
|---|---|---|---|
| 4,066,095 A | 1/1978 | Massa | |
| 5,844,127 A | 12/1998 | Berube et al. | |
| 6,131,441 A | 10/2000 | Berube et al. | |
| 7,526,944 B2 | 5/2009 | Sabata et al. | |
| 8,362,919 B2 | 1/2013 | Cooper et al. | |
| 2017/0219157 A1* | 8/2017 | Ethirajan | H04W 4/70 |

* cited by examiner

*Primary Examiner* — Nguyen Q. Ha
(74) *Attorney, Agent, or Firm* — Kenneth A. Roddy

(57) ABSTRACT

A magnetic pipeline pressure sensor/monitor magnetically mounted on the interior of a pipeline or section thereof by a permanent magnet includes a pressure sensor transducer that senses and monitors pressure inside the pipeline or section thereof, and a battery powered transceiver that monitors and wirelessly reports the sensed internal pipeline pressure to a remote receiver via a wireless RF signal. An external antenna in communication with the pressure sensor apparatus may be attached to the exterior of the pipeline or section thereof to send and receive wireless RF signals between the pressure sensor apparatus and the remote receiver. The pipeline or section thereof may be utilized as a tubular waveguide to conduct the signals through the pipe between the pressure sensor apparatus and an external antenna attached to the exterior of the pipeline or section thereof to send and receive wireless RF signals between the pressure sensor apparatus and the remote receiver.

1 Claim, 1 Drawing Sheet

MAGNETIC PIPELINE PRESSURE SENSOR/MONITOR WITH WIRELESS TRANSCEIVER

CROSS REFERENCE TO RELATED APPLICATION

This application claims priority of U.S. Provisional Application Ser. No. 62/363,265, filed Jul. 16, 2016.

BACKGROUND OF THE INVENTION

1. Field of the Invention

This invention relates generally to pipeline pressure sensors and monitoring systems, and, more particularly to a magnetic pipeline pressure sensor/monitor that is magnetically mounted on the interior of the pipeline and includes a pressure sensor transducer, and a battery powered transceiver, that monitors and wirelessly reports internal pipeline pressure to a remote receiver via a RF signal.

2. Background Art

There are several patents directed toward various pipeline pressure sensors and monitoring systems. The following are several examples.

Massa, U.S. Pat. No. 4,066,095, discloses an automatic leakage detection system for pipelines carrying fluids wherein a plurality of ultrasonic flow meter measurement probes are located at spaced intervals along the length of a pipeline carrying a fluid and each probe measures the rate of flow of the fluid at each location along the line. If a leak develops at any point along the pipeline the nearest probe located upstream from the leak will read higher than the measurement being made by the nearest downstream flow meter probe. The difference in readings between the adjacent probes will be an indication of the magnitude of the leak and when the difference exceeds a preset threshold limit an alarm will sound and a coded command signal will be transmitted from the data monitoring center to initiate the immediate closing of the nearest upstream and downstream shut-off valves in the vicinity of the leak. Small ultrasonic transducers are mounted facing each other and sealed to opposite ends of a tubular fixture which is in turn sealed to the lower end of a tubular stem that passes through and is sealed to a pipe plug which serves to attach and seal the probe assembly to the conduit.

Sabata et al, U.S. Pat. No. 7,526,944, discloses a wireless sensor network installed inside pipelines that uses sensors and wireless transceivers for monitoring the pipeline and recommending maintenance and repair at specific locations in the pipeline. Maintenance includes detection of internal corrosion using sensors that can result in leaks and detection of leaks for prevention of catastrophic failures as a result of damage, such as third party mechanical damage. After establishing the wireless sensor network, the network is activated so the sensors can make measurements periodically or continuously using instructions transmitted via a base station. The sensor data from the various sensors are transmitted inside the pipe and extracted to access points in the pipeline to a remote computer that stores the data within the computer. The sensed information can be used for monitoring as well as analysis using a recommendation engine to provide maintenance and repair alerts.

Cooper et al, U.S. Pat. No. 8,362,919, discloses a system for sensing and communicating in a pipeline that contains a fluid. An acoustic signal containing information about a property of the fluid is produced in the pipeline. The signal is transmitted through the pipeline. The signal is received with the information and used by a control.

The prior art also provides various tools for "hot tapping", which is a method of providing a branch connection to an existing pipe line under operating conditions while it is under pressure for flowing product into or out of the pipeline or introducing tooling into a pressurized pipeline.

The prior art also provides various tools for conducting weld integrity tests on conduits. For example, Berube, el al, U.S. Pat. Nos. 6,131,441 and 5,844,127, teach weld testing tools that isolate a particular section of a pipe (such section including a weld) and subject the section to a high pressure fluid within a constrained annular space defined by the tool and the inner surface of the pipe. The testing tools typically isolate the pipe section with a capping flange, and pressure of the fluid within the annular space is typically monitored by a conventional visual dial-type pressure gauge which is attached to the capping flange with a threaded nipple, and is visually monitored to determine any pressure drop which signifies a leak in the weld.

One of the major problems with pressure transducers, and visual dial-type pressure gauges that are mounted in communication with a pressurized section of the pipeline by a threaded pipe plug or nipple, is that there is a risk that the threaded connection may fail in the event of an overpressure situation, and the threaded pipe plug or nipple and gauge can become a dangerous projectile to persons or equipment in close proximity to the monitored site.

SUMMARY OF THE INVENTION

The present invention overcomes the aforementioned problems and is distinguished over the prior art in general, and these patents in particular by a magnetic pipeline pressure sensor/monitor that is magnetically mounted on the interior of the pipeline and includes a pressure sensor transducer that senses and monitors the pressure inside the pipeline or section thereof, and a battery powered transceiver that monitors and wirelessly reports the sensed internal pipeline pressure to a remote receiver via a wireless RF signal. The remote receiver may be a desktop or laptop computer, a tablet, or a cell phone. The pressure sensor apparatus is secured to a permanent magnet which, in a preferred embodiment, is a high-strength permanent magnet such as a grade N52 neodymium magnet, but not limited thereto. The permanent magnet is magnetically attached to the interior side wall of the pipeline or section thereof to retain the pressure sensor apparatus thereon.

The frequency of the transmitted signal may vary depending upon the diameter of the pipeline and distance from the pressure sensor apparatus to the remote receiver. In some applications, an external antenna in communication with the pressure sensor apparatus may be attached to the exterior of the pipeline or section thereof to send and receive wireless RF signals between the pressure sensor apparatus and the remote receiver. In other applications, the pipeline or section thereof may be utilized as a tubular waveguide to conduct the signals through the pipe between the pressure sensor apparatus and an external antenna attached to the exterior of the pipeline or section thereof to send and receive wireless RF signals between the pressure sensor apparatus and the remote receiver.

One of the significant features and advantages of the present invention is that it eliminates the need to attach pressure transducers, and visual dial-type pressure gauges, to a pressurized section of pipe by a threaded pipe plug or nipple, and thereby eliminates the risk that the threaded connection may fail in the event of an overpressure situation and cause the threaded pipe plug or nipple and gauge to become a dangerous projectile to persons or equipment in close proximity to the monitored site.

Other features and advantages of the invention will become apparent from time to time throughout the specification and claims as hereinafter related.

DETAILED DESCRIPTION OF THE INVENTION

Figure 1:
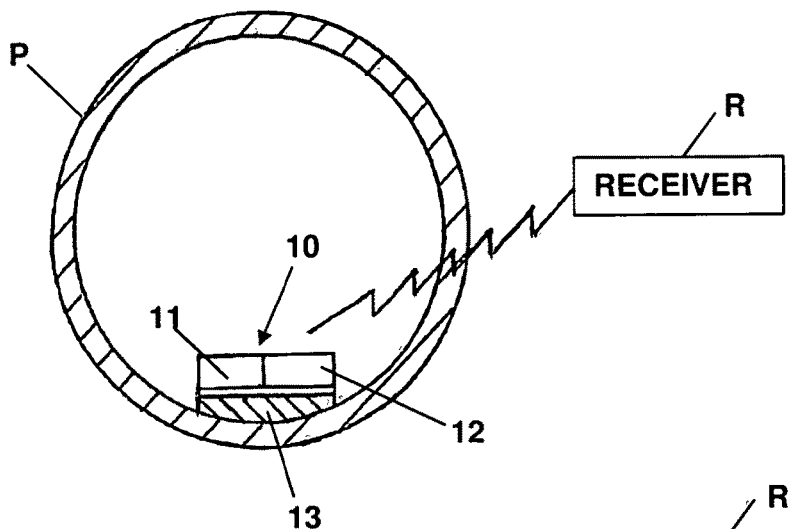
FIG. 1 is a transverse cross section view of a pipeline showing the pressure sensor apparatus mounted therein by a permanent magnet in accordance with the present invention.
Figure 2:
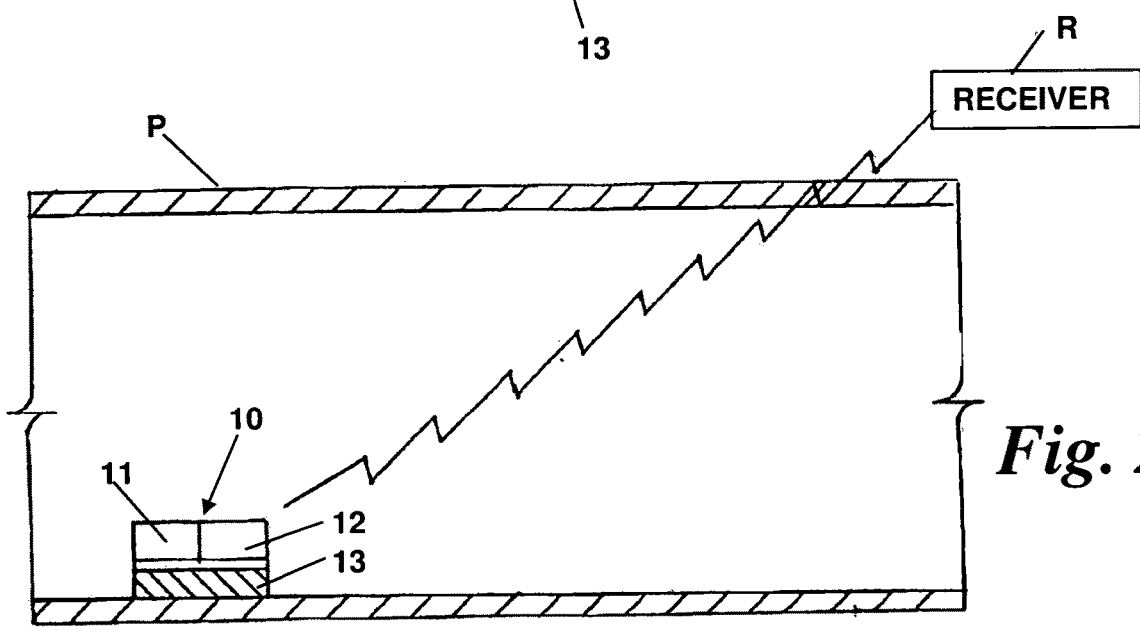
FIG. 2 is a longitudinal cross section view of the pipeline and the pressure sensor apparatus mounted therein.

Referring to the drawings by numerals of reference, there is shown in FIGS. 1 and 2, a pipeline P having the pressure sensor apparatus 10, mounted therein by a permanent magnet 13 in accordance with the present invention. The pressure sensor apparatus 10 includes a pressure sensor transducer 11 that senses and monitors the pressure inside the pipeline P or section thereof, and a battery powered transceiver 12 that wirelessly reports the sensed internal pipeline pressure to a remote receiver R via a wireless RF signal.

The pressure sensor apparatus 10 is secured to a permanent magnet 13. In a preferred embodiment, the permanent magnet 13 is a high-strength permanent magnet such as a grade N52 neodymium magnet, but not limited thereto. The magnet 13 is magnetically attached to the interior side wall of the pipeline P or section thereof to retain the pressure sensor apparatus thereon.

The frequency of the transmitted signal may vary depending upon the diameter of the pipeline P and distance from the pressure sensor apparatus 10 to the remote receiver R. The remote receiver R may be a desktop or laptop computer, a digital tablet or pad, or a cell phone.

Figure 3:
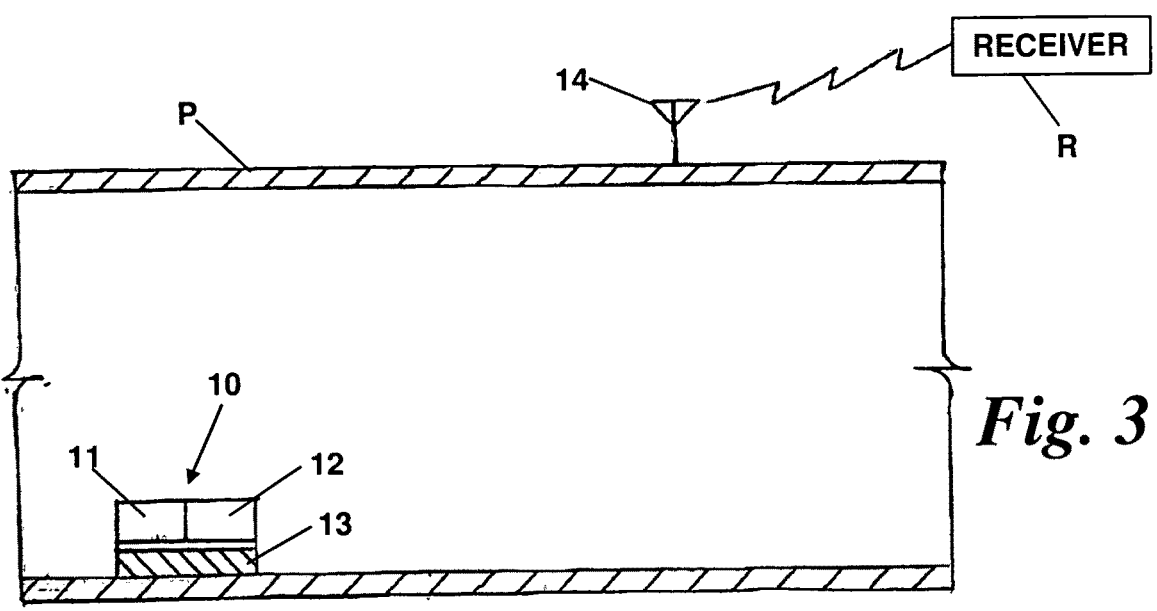
FIG. 3 is a longitudinal cross section view of a pipeline and the pressure sensor apparatus mounted therein wherein an external antenna in communication with the pressure sensor apparatus is attached to the exterior of the pipeline to send and receive wireless RF signals between the pressure sensor apparatus and the remote receiver.

As shown in FIG. 3, in some applications, an external antenna 14 in communication with the pressure sensor apparatus 10 may be attached to the exterior of the pipeline P or section thereof to send and receive wireless RF signals between the pressure sensor apparatus and the remote receiver R.

In other applications, the pipeline P or section thereof may be utilized as a tubular waveguide to conduct the signals through the pipe between the pressure sensor apparatus 10 and an external antenna 14 attached to the exterior of the pipeline P or section thereof to send and receive wireless RF signals between the pressure sensor apparatus and the remote receiver R.

While the present invention has been disclosed in various preferred forms, the specific embodiments thereof as disclosed and illustrated herein are considered as illustrative only of the principles of the invention and are not to be considered in a limiting sense in interpreting the claims. The claims are intended to include all novel and non-obvious combinations and sub-combinations of the various elements, features, functions, and/or properties disclosed herein. Variations in size, materials, shape, form, function and manner of operation, assembly and use, are deemed readily apparent and obvious to one skilled in the art from this disclosure, and all equivalent relationships to those illustrated in the drawings and described in the specification are intended to be encompassed in the following claims defining the present invention.

The invention claimed is:

1. A magnetic pipeline pressure sensor/monitor apparatus for ascertaining a pressure inside a pressurized pipeline or section thereof, comprising:

a pressure sensor transducer configured to sense and monitor pressure inside the pressurized pipeline or section thereof;

a battery powered transceiver operatively connected with said pressure sensor transducer configured to report the sensed internal pipeline pressure via a wireless RF signal to a remote receiver selected from the group consisting of a computer, a digital tablet, digital pad, and a cell phone;

a high-strength grade N52 neodymium permanent magnet having a first surface secured to said pressure sensor transducer and said battery powered transceiver, and a second surface magnetically attached to an interior side wall of the pressurized pipeline or section thereof to firmly secure and retain said pressure sensor transducer and said battery powered transceiver thereon, said second surface curved to fit the interior side wall of the pressurized pipeline or section thereof; and an external antenna attached to an exterior side wall of the pressurized pipeline or section thereof and in communication with said transceiver to send and receive wireless RF signals between said transceiver, said pressure sensor transducer, and said remote receiver, and the pressurized pipeline or section thereof is utilized as a tubular waveguide to conduct said signals through the pipeline between said transceiver, said external antenna, and said remote receiver;

wherein the magnetic pipeline pressure sensor/monitor apparatus eliminates the need for visual dial-type pressure gauges threadedly connected to the pressurized pipeline or section thereof by a pipe plug or nipple, and the risk that the threaded connection may fail in the event of an overpressure situation and cause the pipe plug or nipple and gauge to become a dangerous projectile to persons or equipment in close proximity to the pressurized pipeline.

* * * * *